(12) United States Patent
Landmann

(10) Patent No.: US 9,778,124 B2
(45) Date of Patent: Oct. 3, 2017

(54) SEALED TRANSDUCER WITH EXTERNAL ADJUSTMENT PORT

(71) Applicant: KULITE SEMICONDUCTOR PRODUCTS, INC., Leonia, NJ (US)

(72) Inventor: Wolf Landmann, Fair Lawn, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 113 days.

(21) Appl. No.: 14/875,376

(22) Filed: Oct. 5, 2015

(65) Prior Publication Data

US 2016/0097690 A1  Apr. 7, 2016

Related U.S. Application Data

(60) Provisional application No. 62/060,455, filed on Oct. 6, 2014.

(51) Int. Cl.
| | |
|---|---|
| *G01L 9/02* | (2006.01) |
| *G01L 9/08* | (2006.01) |
| *G01L 19/00* | (2006.01) |
| *G01L 9/04* | (2006.01) |
| *G01L 9/06* | (2006.01) |
| *G01L 9/10* | (2006.01) |
| *G01L 9/12* | (2006.01) |

(52) U.S. Cl.
CPC ............ *G01L 9/025* (2013.01); *G01L 9/045* (2013.01); *G01L 9/065* (2013.01); *G01L 9/085* (2013.01); *G01L 9/105* (2013.01); *G01L 9/125* (2013.01)

(58) Field of Classification Search
CPC ..... G01L 9/00; G01L 9/02; G01L 9/04; G01L 9/06; G01L 9/08; G01L 9/025; G01L 9/045; G01L 9/065; G01L 9/085; G01L 9/105; G01L 9/125; G01L 19/00
See application file for complete search history.

(56) References Cited

U.S. PATENT DOCUMENTS

| | | | | |
|---|---|---|---|---|
| 4,298,843 A | * | 11/1981 | Nixon | ........................ G01L 9/06 330/69 |
| 5,099,695 A | * | 3/1992 | Sugano | ............... G01L 19/0038 338/4 |
| 5,193,393 A | * | 3/1993 | Czarnocki | ............. G01L 1/2281 324/105 |
| 2009/0165564 A1 | * | 7/2009 | Matsushima | ......... G01L 1/2262 73/754 |
| 2010/0011870 A1 | * | 1/2010 | Landwehr | ............... G01L 19/14 73/756 |

(Continued)

*Primary Examiner* — Nguyen Ha
(74) *Attorney, Agent, or Firm* — Troutman Sanders LLP; James E. Schutz; Mark Lehi Jones

(57) ABSTRACT

Certain implementations of the disclosed technology may include systems, methods, and apparatus for a sealed transducer with an adjustment port. The sealed transducer may include one or more terminals. A first terminal may include electrical connections for connecting to an input voltage source, a ground, and for providing a transducer output signal. A second terminal, for example, may include an electrical port for connecting to an external and separately sealed adjustment network. In one example implementation, the adjustment network can include one or more components configured to couple with internal circuitry of the transducer to alter a response of the transducer.

20 Claims, 4 Drawing Sheets

(56) References Cited

U.S. PATENT DOCUMENTS

2014/0190237 A1\* 7/2014 Park ................. G01L 27/00
                                                      73/1.57
2015/0300900 A1\* 10/2015 Aoyama ............ G01L 19/0046
                                                      73/723

\* cited by examiner

SEALED TRANSDUCER WITH EXTERNAL ADJUSTMENT PORT

CROSS REFERENCE TO RELATED APPLICATION

This application claims priority under 35 U.S.C. 119 to U.S. Provisional Patent Application 62/060,455, filed on 6 Oct. 2014, the contents of which are hereby incorporated by reference in their entirety as if presented in full.

FIELD

This invention relates to transducers, and more particularly to hermetically sealed transducers having an electrical port for externally adjusting a response of the transducer.

BACKGROUND

Transducers can be utilized in numerous applications to measure a broad range of environmental conditions. Pressure transducers are often used in machines, for example, to monitor various pressures associated with the machine, and to provide control signals for safe and efficient operation of the machine.

Certain pressure transducers can include piezoresistors arranged in a Wheatstone bridge circuit and coupled to a diaphragm. Upon the application of pressure, the sensor's diaphragm may deflect slightly, thereby producing an output voltage proportional to the applied pressure. The transducer response to the pressure stimuli may be a linear relationship, having a certain slope and intercept that can vary depending on numerous factors, including diaphragm stiffness, manufacturing variations, piezoresistive element configurations, circuit component tolerances, temperature, etc.

The transducer response as a function of the exerted pressure can be adjusted or altered during the manufacturing process and before the transducer is hermetically sealed. For example, specific components can be selected and installed within the transducer to provide a customized or desired output response. However, hermetically sealing the transducer typically precludes any additional adjustments to circuit components or values.

In applications for which additional adjustments to the sensor response is needed in the field, the body of the transducer can be designed to include holes for accessing and adjusting potentiometers and/or switches within the internal circuitry of the transducer. In such designs, screws and o-rings are typically utilized to close the access holes after the adjustments, and during operation of the transducer. However, such screw holes can compromise the sealing and reliability of the transducer. For example, sealing failure can occur due to loose or incorrectly tightened screws and/or damaged o-ring seals. This is a major shortcoming of the conventional transducer design. Another shortcoming of the traditional design is that there is no simple and immediate indication that the adjustments are set correctly. For example, an operator can change the settings of these adjustments, either maliciously or mistakenly, resulting in severe degradation of the performance of the system.

There is a need for a sealed transducer that can have its output adjusted without compromising the reliability of the transducer.

BRIEF SUMMARY

Systems, methods, and apparatus are presented herein in accordance with certain example implementations of the disclosed technology for providing a sealed transducer with an external adjustment port.

In one example implementation, a sealed transducer with an adjustment port is provided. The sealed transducer may include one or more terminals. A first terminal, for example, may include electrical connections for connecting to an input voltage source, a ground, and for providing a transducer output signal. A second terminal, for example, may include an electrical port for connecting to an external and separately sealed adjustment network. In one example implementation, the adjustment network can include one or more components configured to couple with internal circuitry of the transducer to alter a response of the sensor.

In an example implementation, a method is provided. The method can include determining a desired transfer function of a hermetically sealed pressure transducer. The can method include selecting, responsive to the determining, an adjustment network for providing the desired transfer function of the sealed pressure transducer. The method can include electrically coupling the adjustment network to a port of the sealed pressure transducer, wherein the adjustment network is hermetically sealed.

Other implementations, features, and aspects of the disclosed technology are described in detail herein and are considered a part of the claimed disclosed technology. Other implementations, features, and aspects of the disclosed technology can be understood with reference to the following detailed description, accompanying drawings, and claims.

BRIEF DESCRIPTION OF THE FIGURES

The disclosed technology is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
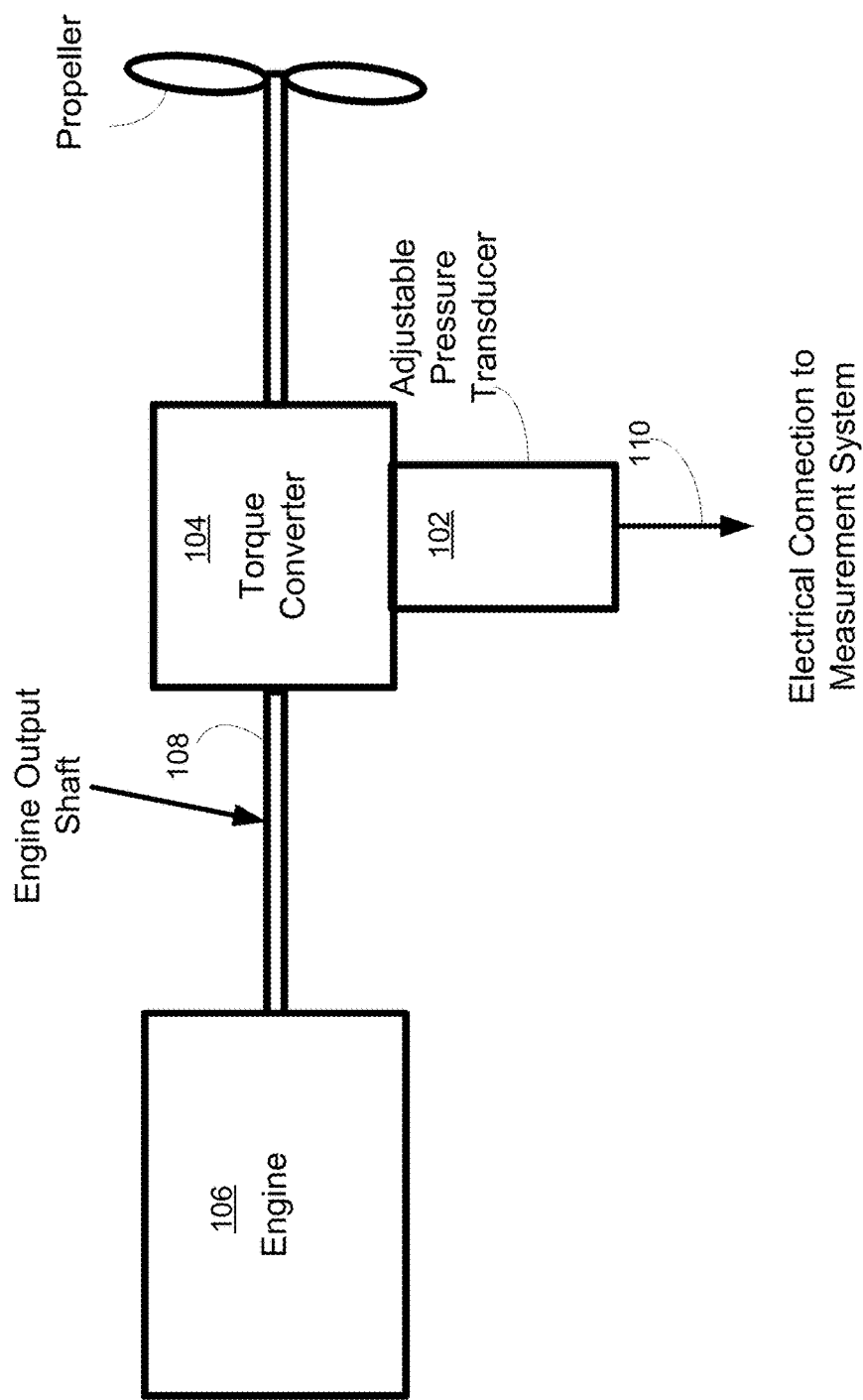
FIG. 1 illustrates a typical mechanical system that utilizes an adjustable pressure transducer.

The disclosed technology relates to hermetically sealed transducers having an electrical port for externally adjusting a response of the transducer.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description.

References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner. Various implementations will now be described with reference to the accompanying figures.

Certain implementations of the disclosed technology provide for a hermetically sealed and tamperproof transducer with adjustable output. This disclosure describes systems and methods for implementing a pressure transducer with externally accessible compensating network. The compensating network may enable the pressure transducer to be adjusted/compensated, as needed, for variations in the characteristics of an associated system without compromising the hermetic seal.

Certain transducers, as disclosed herein, have a nominal output versus pressure response that can be approximated by a straight line having a certain slope (in mV/psi for a voltage output or mA/psi for a current output) and a certain zero-pressure output or y-intercept (e.g. 0V or 0.5V for a voltage output or 4 mA for a current output). In some pressure-measurement applications, transducers are desired for which the slope and the y-intercept of the output versus pressure transfer function can be individually adjusted in a limited range in order to compensate other characteristics of the system where the transducer is used.

FIG. 1 depicts a representative system and application in which an adjustable pressure transducer 102 measures torque from a torque converter 104, according to an example implementation of the disclosed technology. The torque converter 104, for example, may be a subsystem coupled to engine 106, and may convert the torque transmitted from the engine 106 to an output shaft 108 and into a pressure of a fluid. The pressure versus torque transfer function is usually a linear function (i.e., a straight line). Therefore, by measuring the pressure, an estimate of the torque can be determined. In an example implementation, the signal 110 from the adjustable pressure transducer 102 may be fed by an electrical connection to a measurement system.

A challenge associated with systems as shown in FIG. 1 is that the torque converter 104 can have manufacturing variations from unit to unit resulting in large transfer function differences from unit to unit. By using pressure transducers with a fixed transfer function, the measurement of the torque can result in large unacceptable errors. It is therefore desirable to obtain an accurate torque measurement, as excessive torques can result in damage to the engine and can unnecessarily increase fuel consumption.

In order to compensate for the errors of each individual torque converter 104, and according to an example implementation of the disclosed technology, the transducer 102 used to measure the pressure output of a given torque converter 104 may include adjustments for its slope and y-intercept, allowing an operator to compensate the errors of the torque converter 104.

An additional challenge associated with systems as shown in FIG. 1 is to protect the adjustable pressure transducer 102 from the harsh environment. Certain example implementations of the disclosed technology provide for a hermetically sealed adjustable pressure transducer 102.

According to an example implementation of the disclosed technology, the torque converter's 104 actual characteristics may be determined during the manufacturing process, and then marked (stamped) on the body of the converter. In certain example implementations, the pressure transducer 102 may be adjusted (for example, by coupling with an external adjustment network) to correspond to these markings and/or to produce the correct output for any given torque.

Figure 2:
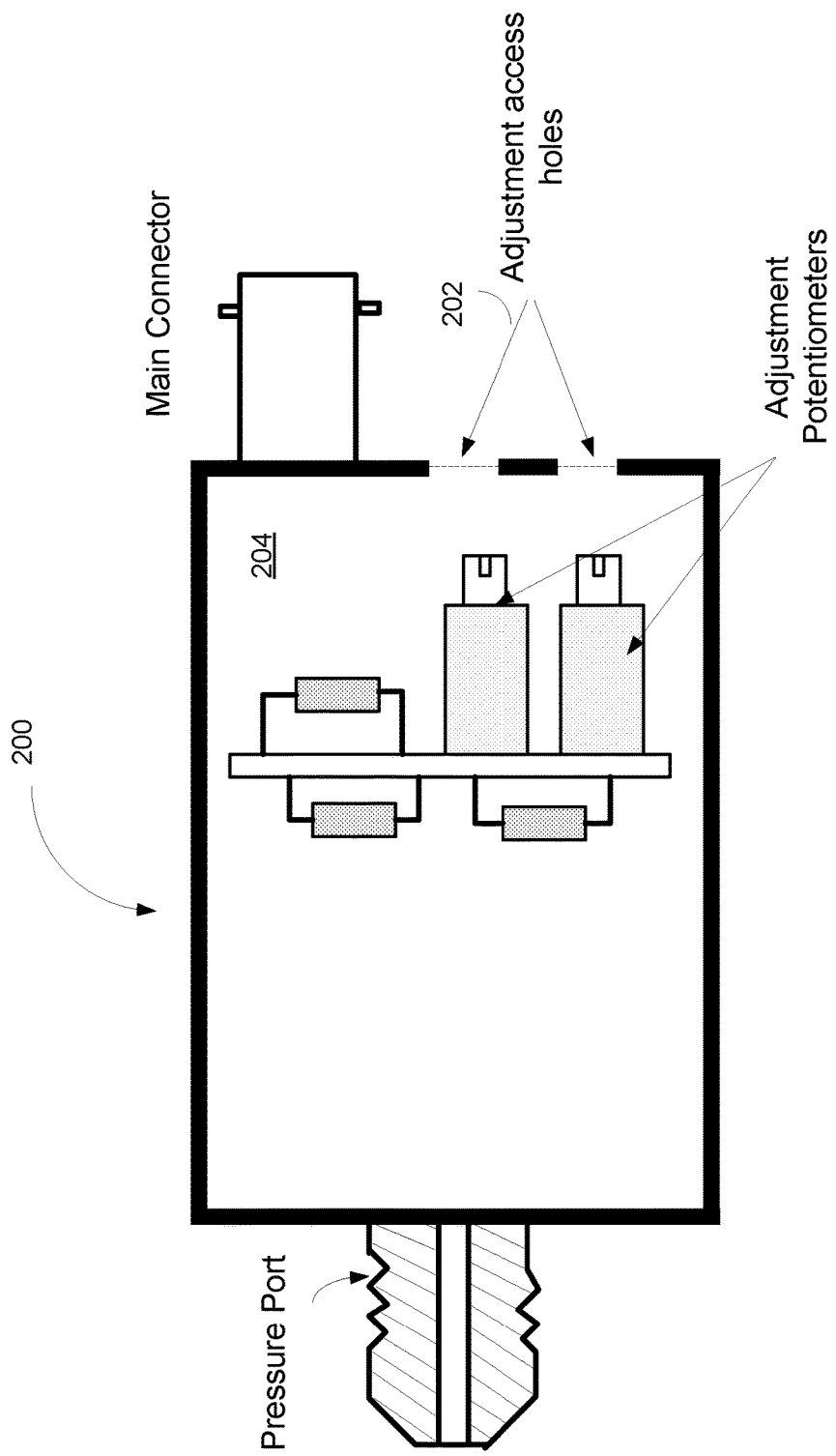
FIG. 2 illustrates a conventional adjustable pressure transducer having adjustment access holes.

FIG. 2 depicts a conventional transducer 200. In this transducer 200, adjustment holes 202 provide access to adjustment potentiometers 204 or switches within the transducer 200. Due to the need for external accessibility to the adjustments, the seal of the conventional transducer 200 may be compromised, particularly in harsh environments, such as in or near engines.

Figure 3:
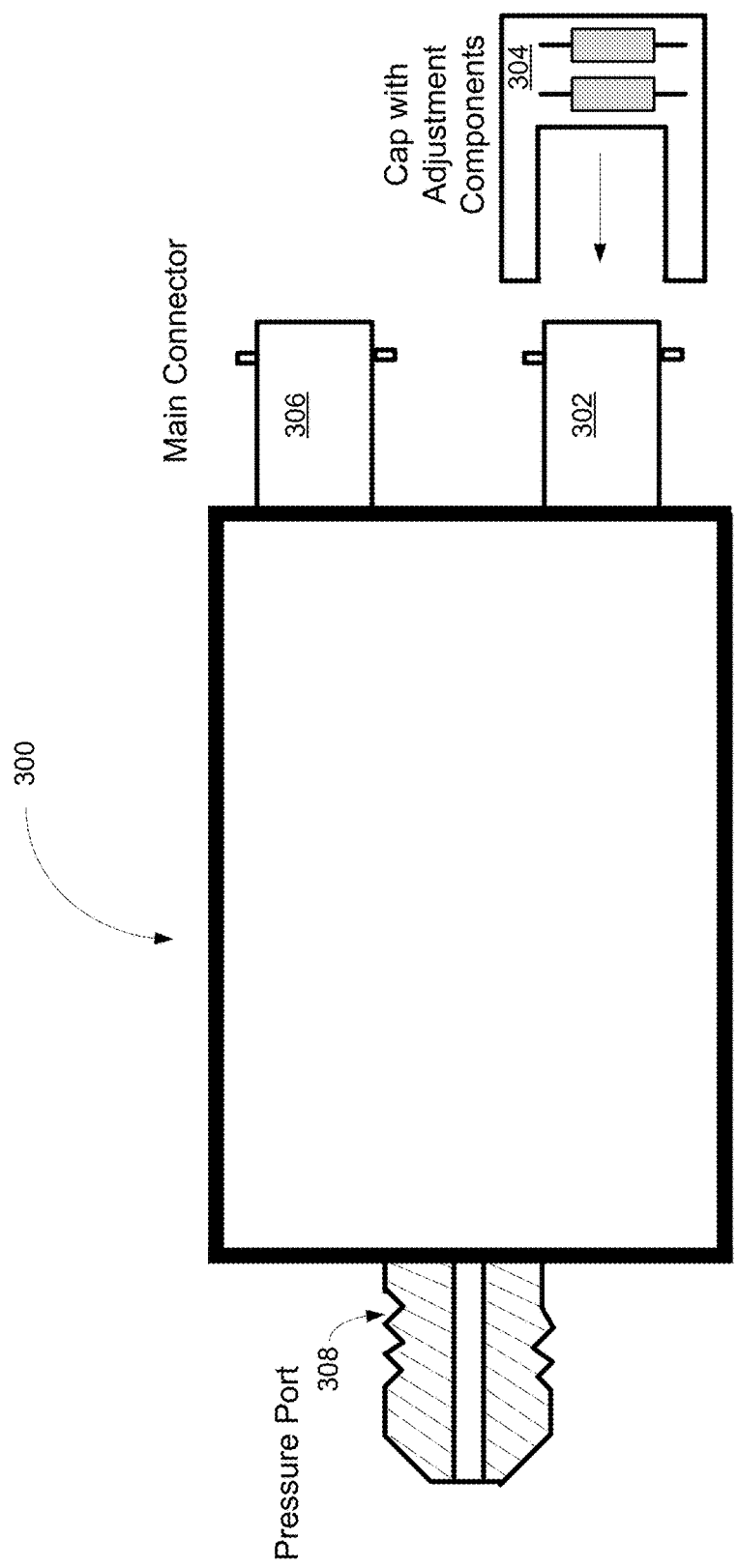
FIG. 3 illustrates an example embodiment of a sealed adjustable pressure transducer, according to various aspects described herein.

FIG. 3 depicts an adjustable pressure transducer 300 according to an example implementation of the disclosed technology. The adjustable pressure transducer 300 as shown in FIG. 3 differs from the conventional transducer 200 (as shown in FIG. 2) in that the adjustable pressure transducer 300 may include a compensation connector 302 (in addition to the main connector 306). For example, the main connector 306 may include the usual signals and functions of a standard transducer: VIN (Excitation voltage), RETURN, OUTPUT, and this main connector 306 may connect to the system in the usual way.

According to an example implementation of the disclosed technology, the compensation connector 302 may include electrically accessible and dedicated pins (or conductors) coupled to internal circuitry of the adjustable pressure transducer 300 such that by connecting external resistors (and/or other components) to these pins, the transfer function slope and y-intercept may be changed in a well defined manner. In one example implementation, the external resistors may be connected to the internal circuitry to affect the internal gain setting (for example, to adjust the slope of the output vs. pressure via an amplifier with adjustable gain). In another example implementation, the external resistors may be connected internal voltage dividers associated with the internal circuitry of the adjustable pressure transducer 300, for example, to alter the output intercept.

According to an example implementation of the disclosed technology, the above-mentioned external resistors may be enclosed in a small hermetic cap 304 (or package) which may mate with the compensation connector 302 of the adjustable pressure transducer 300 and electrically couple with the internal circuitry of the transducer 300. In one example implementation, the cap 304 may be marked with the actual slope and y-intercept corresponding to the resistors in the cap 304. In another example implementation, the cap 304 may be specific for a given torque converter, matching the predetermined characteristics of the converter.

Certain example implementations of the disclosed technology may combine the various conductors associated with the compensation connector 302 and those of the main connector 306 to provide a single connector for handling the function associated with both connectors 302 306.

In accordance with an example implementation of the disclosed technology, the adjustable pressure transducer 300 may provide an indication to the system operator when the cap 304 is not properly connected. For example, and according to one implementation, the compensation connector 302 may include two additional pins that short together when the cap 304 is properly attached. For example, properly attaching the cap 304 to the compensation connector 302 may complete a short circuit between the two additional pins. In another example implementation, properly attaching the cap 304 may open a circuit, which may in turn provide a signal that the cap 304 is properly connected to the compensation connector 302.

In an example implementation, the transducer 300 circuitry may be designed such that when the cap 304 is not properly connected to the compensation connector 302, the output of the transducer may be changed in a manner to indicate to that the cap 304 is not connected. In one example implementation, the indication can include forcing the output to go to zero or out of range. In another example implementation, the indication can switch the output periodically every few seconds between zero and an average slope/y-intercept. Such an indication that the cap 304 is not connected may provide a useful albeit inaccurate indication of the operation, pressure, and/or torque. In certain example implementations, a system operator may be alerted (for example, by an alarm) if the cap 304 is not connected.

Certain embodiments of the disclosed technology can provide the technical effects of producing adjustable transducers that may be hermetically enclosed. Certain embodiments of the disclosed technology can provide the additional technical effects of enabling an operator to verify transducer compensation for a given torque converter by reading and comparing the markings on the cap 304 and on the torque converter. Certain embodiments of the disclosed technology can provide the additional technical effects of providing a foolproof and tamperproof adjustable pressure transducer 300. For example, a missing or disconnected adjustment cap 304 may trigger a signal or alarm.

Figure 4:
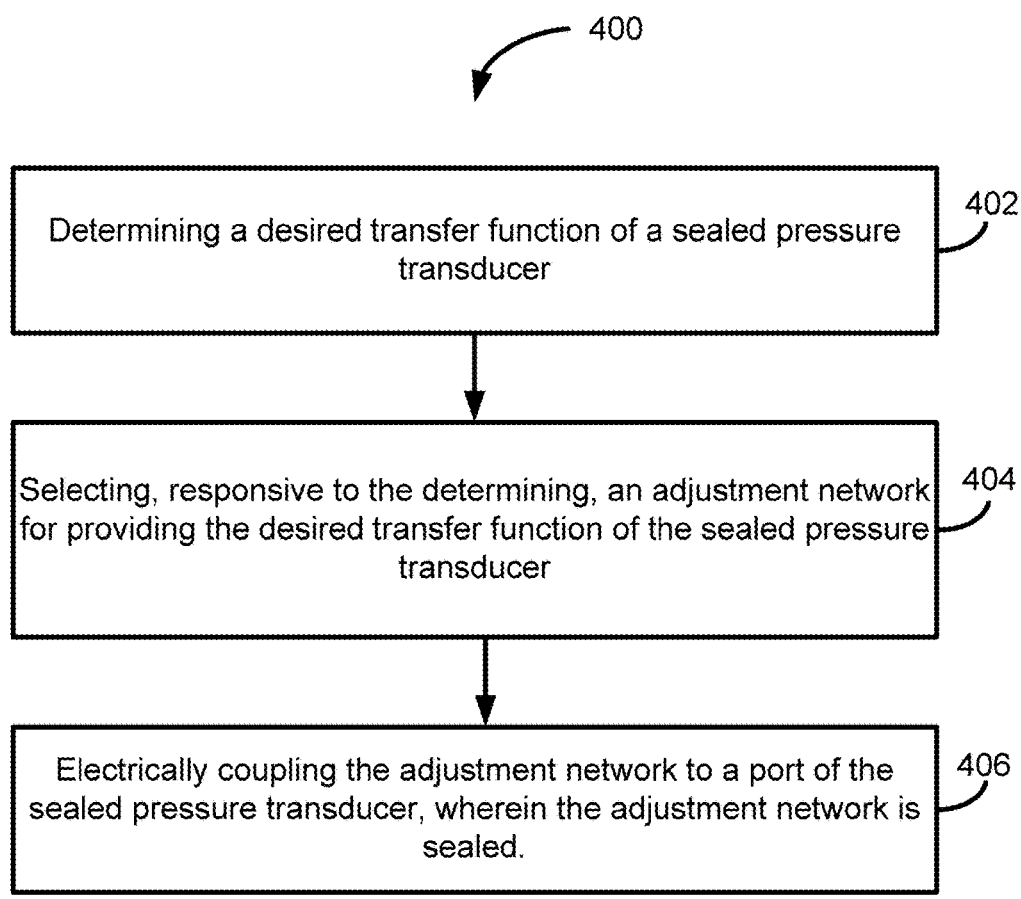
FIG. 4 is a flow-diagram of a method, according to an example implementation of the disclosed technology.

FIG. 4 is a flow-diagram of a method 400, according to an example implementation of the disclosed technology. In block 402, the method 400 includes determining a desired transfer function of a hermetically sealed pressure transducer. In block 404, the method 400 includes selecting, responsive to the determining, an adjustment network for providing the desired transfer function of the sealed pressure transducer. In block 406, the method 400 includes electrically coupling the adjustment network to a port of the sealed pressure transducer, wherein the adjustment network is sealed.

In accordance with an example implementation of the disclosed technology, one or more of the sealed pressure transducer and the adjustment network is hermetically sealed.

In an example implementation, electrically coupling the adjustment network to the port of the sealed pressure transducer configures the sealed pressure transducer to provide a compensated output as a function of input pressure.

In certain example implementations, the compensated output can include one or more of an adjusted gain, an adjusted output slope, and an adjusted intercept.

Certain example implementations may include marking the adjustment network with compensation identification information. For example, the adjustment network may be installed in a cap, and the cap may be marked with a serial number, component values, gain, intercept, etc.

In certain example implementations, the method can include measuring an uncompensated transfer function of the sealed pressure transducer, and selecting the adjustment network for providing the desired transfer function of the sealed pressure transducer may be further based on the uncompensated transfer function.

In an example implementation, the adjustment network can include one or more components configured to provide an altered output to indicate one or more of electrical coupling and electrical decoupling of the adjustment network with the sealed pressure transducer. For example, this altered output may be distinguishable to indicate and/or verify proper coupling of the adjustment network to the sealed pressure transducer.

While certain implementations of the disclosed technology have been described in connection with what is presently considered to be the most practical implementations, it is to be understood that the disclosed technology is not to be limited to the disclosed implementations. Rather, the disclosed technology is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method comprising:
   determining a desired transfer function of a sealed pressure transducer;
   selecting, responsive to the determining, an external adjustment cap comprising one or more adjustment components for providing the desired transfer function of the sealed pressure transducer; and
   electrically coupling the adjustment cap to a port of the sealed pressure transducer, wherein the adjustment cap is sealed.

2. The method of claim 1, wherein one or more of the sealed pressure transducer and the adjustment cap is hermetically sealed.

3. The method of claim 1, wherein electrically coupling the adjustment cap to the port of the sealed pressure transducer configures the sealed pressure transducer to provide a compensated output as a function of input pressure.

4. The method of claim 3, wherein the compensated output comprises one or more of an adjusted gain, an adjusted output slope, and an adjusted intercept.

5. The method of claim 1, further comprising marking the adjustment cap with compensation identification information.

6. The method of claim 1, further comprising measuring an uncompensated transfer function of the sealed pressure transducer, and wherein selecting the adjustment cap for providing the desired transfer function of the sealed pressure transducer is further based on the uncompensated transfer function.

7. The method of claim 1, wherein the one or more adjustment components of the adjustment cap are configured to provide an altered output to indicate one or more of electrical coupling and electrical decoupling of the adjustment cap with the sealed pressure transducer.

8. A device comprising:
a sealed transducer comprising:
a terminal comprising electrical connections for one or more of an input voltage source, a ground, and an output; and
an adjustment port for electrically coupling to an external adjustment cap comprising one or more adjustment components, wherein the adjustment cap is sealed.

9. The device of claim 8, wherein one or more of the sealed pressure transducer and the adjustment cap is hermetically sealed.

10. The device of claim 8, wherein the adjustment port is configured to provide a compensated output of the sealed pressure transducer as a function of input pressure when the adjustment cap is electrically coupled to the adjustment port.

11. The device of claim 10, wherein the compensated output comprises one or more of an adjusted gain, an adjusted output slope, and an adjusted intercept.

12. The device of claim 8, wherein the adjustment cap includes identification information.

13. The device of claim 8, wherein the adjustment cap is configured based on an uncompensated transfer function and a desired transfer function of the sealed transducer.

14. The device of claim 8, wherein the one or more adjustment components of the adjustment cap are configured to provide an altered output to indicate one or more of electrical coupling and electrical decoupling of the adjustment cap with the sealed pressure transducer.

15. A system comprising:
a sealed transducer comprising:
a terminal comprising electrical connections for one or more of an input voltage source, a ground, and an output;
an adjustment port; and
an adjustment cap comprising one or more components configured to couple with internal circuitry of the sealed transducer by the adjustment port to alter a response of the sealed transducer, wherein the adjustment cap is sealed.

16. The system of claim 15, wherein one or more of the sealed transducer and the adjustment cap is hermetically sealed.

17. The system of claim 15, wherein the adjustment port is configured provide a compensated output of the sealed pressure transducer as a function of input measurement when the adjustment cap is electrically coupled to the adjustment port.

18. The system of claim 17, wherein the compensated output comprises one or more of an adjusted gain, an adjusted output slope, and an adjusted intercept.

19. The system of claim 15, wherein the adjustment cap includes identification information.

20. The system of claim 15, wherein the one or more adjustment components of the adjustment cap are configured to provide an altered output to indicate one or more of electrical coupling and electrical decoupling of the adjustment cap with the sealed pressure transducer.

\* \* \* \* \*